United States Patent
Cheng et al.

(10) Patent No.: US 7,586,286 B2
(45) Date of Patent: Sep. 8, 2009

(54) METHOD AND APPARATUS FOR MOTOR CONTROL

(75) Inventors: Bing Cheng, West Bloomfield, MI (US); Tod R. Tesch, Novi, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 339 days.

(21) Appl. No.: 11/601,461

(22) Filed: Nov. 17, 2006

(65) Prior Publication Data

US 2008/0116842 A1  May 22, 2008

(51) Int. Cl.
    H02P 27/04 (2006.01)
(52) U.S. Cl. .................... 318/807; 318/712; 318/717; 318/719; 318/812; 318/800; 318/723; 318/799; 318/815; 318/700
(58) Field of Classification Search .......... 318/712, 318/717, 719, 812, 800, 723, 799, 807, 815, 318/700
See application file for complete search history.

(56) References Cited

U.S. PATENT DOCUMENTS

| | | | | |
|---|---|---|---|---|
| 5,038,092 A * | 8/1991 | Asano et al. | ............... | 318/811 |
| 5,313,147 A * | 5/1994 | Yoneda et al. | ............... | 318/569 |
| 5,504,404 A | 4/1996 | Tamaki et al. | ............... | 318/432 |
| 5,585,708 A * | 12/1996 | Richardson et al. | ......... | 318/800 |
| 5,585,709 A * | 12/1996 | Jansen et al. | ............... | 318/807 |
| 5,689,166 A * | 11/1997 | Nagayama et al. | .......... | 318/721 |
| 5,717,305 A * | 2/1998 | Seibel et al. | ............... | 318/778 |
| 5,923,144 A * | 7/1999 | Seibel et al. | ............... | 318/805 |
| 5,923,728 A | 7/1999 | Ikkai et al. | ............... | 378/807 |
| 6,163,128 A * | 12/2000 | Hiti et al. | ............... | 318/722 |
| 6,504,329 B2 | 1/2003 | Stancu et al. | ............... | 318/254 |
| 6,762,581 B2 | 7/2004 | Karikomi | ............... | 318/800 |
| 6,936,991 B2 * | 8/2005 | Chen et al. | ............... | 318/700 |
| 7,023,168 B1 | 4/2006 | Patel et al. | ............... | 318/757 |
| 2006/0055363 A1 * | 3/2006 | Patel et al. | ............... | 318/757 |
| 2006/0061320 A1 * | 3/2006 | Ma et al. | ............... | 318/801 |
| 2006/0066275 A1 * | 3/2006 | Thunes et al. | ............... | 318/432 |
| 2006/0132082 A1 * | 6/2006 | Ihm et al. | ............... | 318/717 |
| 2007/0021873 A1 * | 1/2007 | Richards | ............... | 700/286 |
| 2007/0035263 A1 * | 2/2007 | Rastogi et al. | ............... | 318/432 |

OTHER PUBLICATIONS

Morimoto, S., *Analysis, design and control of the IPM motor*, chapter 8, "IPM Vector Control and Flux Weakening," pp. 8-1 through 8-35, 2004 IAS Annual Meeting on Design, Analysis and Control of IPM Synchronous Machines.

* cited by examiner

*Primary Examiner*—Rita Leykin

(57) ABSTRACT

A system and method for controlling a permanent magnet motor are disclosed. Briefly described, one embodiment receives a torque command and a flux command; receives information corresponding to a direct current (DC) bus voltage and a motor speed; computationally determines feedforward direct-axis current information and feedforward quadrature-axis current information from a plurality of parameters associated with the permanent magnet motor; determines a current signal ($i_{dq}$*) based upon at least the requested torque command, the flux command, the DC bus voltage, the motor speed, the feedforward direct-axis current information, and the feedforward quadrature-axis current information; and controls a power inverter that converts DC power into alternating current (AC) power that is supplied to the permanent magnet motor, such that the permanent magnet motor is operated in accordance with the determined $i_{dq}$*.

21 Claims, 9 Drawing Sheets

METHOD AND APPARATUS FOR MOTOR CONTROL

BACKGROUND

1. Field

The present disclosure generally relates to motor control, and more particularly relates to permanent magnet or interior permanent magnet motor control.

2. Description of the Related Art

The permanent magnet (PM) synchronous motor possesses many appealing characteristics for various applications, including pure-electric or hybrid-electric vehicles. The maximum input power of a vehicle is dictated, in part, by the size of the power sources (i.e., battery, fuel cell engine, supercapacitor, etc.). Direct current (DC) power is the product of the DC voltage and DC current. Quite often, the DC bus voltage varies with motor output power (i.e., Torque*Speed). As a result, rapid changes in vehicle load may cause large fluctuations in the DC bus voltage.

Traction electric motors may be used to propel electric or hybrid vehicles. A traction electric motor drive is often required to perform over a wide operating range. Typically the operating range of an electric machine, such as the traction electric motor, is divided into two regions: a constant torque region and a constant power region. It is important to maintain the ability to change quickly and smoothly between the constant torque and constant power modes of operation.

Interior permanent magnet (IPM) synchronous motors are also used in electric vehicle traction drives due to their positive features such as high efficiency and high power density. Such applications require the motor drives to work in a wide speed range and constant power while maintaining high efficiency. In the high speed range, or in field-weakening mode operation, the optimal motor current commands are not only a function of speed and requested torque, but also a function of various motor parameters, DC bus voltage and motor temperature.

Existing PM or IPM motor control methods and apparatus, particularly in electric or hybrid vehicle applications, may perform poorly when the DC bus voltage varies. Rapid fluctuation of the DC bus voltage, for example due to rapidly changing power demands, exacerbates this problem, and existing PM or IPM motor control systems and methods are typically unable to adequately compensate. Furthermore, due to the multiple optimal curves and boundaries imposed on the motor current commands, simple regulators that can control the motor torque output precisely and quickly in the high speed and/or the field weakening operating regions do not appear to be available. Accordingly, a control system method and apparatus is desirable.

BRIEF SUMMARY OF THE INVENTION

A system and method for controlling a permanent magnet motor are disclosed. According to one embodiment, a method comprises receiving a torque command and a flux command; receiving information corresponding to a direct current (DC) bus voltage and a motor speed; computationally determining feedforward direct-axis current information and feedforward quadrature-axis current information from a plurality of parameters associated with the permanent magnet motor; determining a current signal ($i_{dq}^*$) based upon at least the requested torque command, the flux command, the DC bus voltage, the motor speed, the feedforward direct-axis current information, and the feedforward quadrature-axis current information; and controlling a power inverter that converts DC power into alternating current (AC) power that is supplied to the permanent magnet motor, such that the permanent magnet motor is operated in accordance with the determined $i_{dq}^*$.

According to another embodiment, a system which controls a permanent magnet motor comprises feedforward direct-axis current information that is computationally determined from a plurality of parameters associated with the permanent magnet motor; feedforward quadrature-axis current information that is computationally determined from the plurality of parameters associated with the permanent magnet motor; a current regulator that receives a current signal ($i_{dq}^*$) determined from a received torque command, information corresponding to a DC bus voltage, information corresponding to a motor speed, the feedforward direct-axis current information, and the feedforward quadrature-axis current information, and that generates a control signal based upon the received signal command ($i_{dq}^*$); and a power inverter controllably coupled to the current regulator that converts received DC power into AC power based upon the control signal generated by the current regulator.

According to yet another embodiment, a method for controlling a permanent magnet motor comprises computationally determining a direct-axis current feedforward table from a plurality of parameters associated with the permanent magnet motor; computationally determining a quadrature-axis current feedforward table from the plurality of parameters associated with the permanent magnet motor; determining a current command comprising a direct-axis current determined from the direct-axis current feedforward table and a quadrature-axis current determined from the quadrature-axis current feedforward table; and controlling a power inverter that converts DC power into AC power that is supplied to the permanent magnet motor, such that the permanent magnet motor is operated in accordance with the determined direct-axis current and the determined quadrature-axis current.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements, as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various embodiments. However, one skilled in the art will understand that the embodiments may be practiced without these details. In other instances, well-known structures associated with PM motors, controllers, microprocessors, and various electrical components have not been shown or described in detail to avoid unnecessarily obscuring descriptions of the embodiments.

Unless the context requires otherwise, throughout this specification and claims which follow, the word "comprise" and variations thereof, such as, "comprises" and "comprising" are to be construed in an open, inclusive sense, that is as "including, but not limited to."

The headings provided herein are for convenience only and do not interpret the scope or meaning of the claimed invention.

Figure 1:
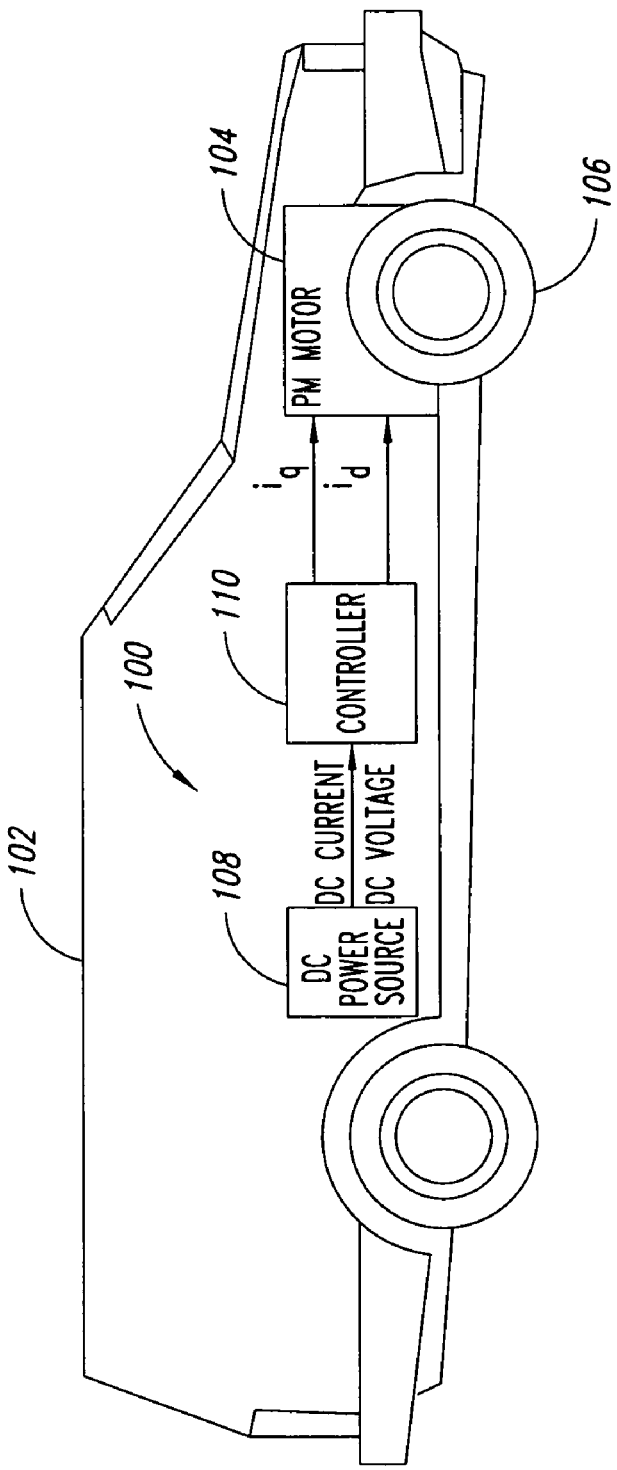
FIG. 1 is a schematic diagram of a torque feedforward compensation system implemented in an electric or hybrid vehicle.

FIG. 1 is a schematic diagram of a torque feedforward compensation system 100 implemented in an electric or hybrid vehicle 102. The torque feedforward compensation system 100 provides, in part, control signals for operation of a permanent magnet (PM) traction motor 104 mechanically coupled to drive at least one wheel 106. In the various embodiments, the motor 104 may be a permanent magnet (PM) traction motor, an interior permanent magnet (IPM) traction motor, or other suitably controllable electric motor. Further, such motors may be operable in a generation mode, such as during regenerative braking operations.

The vehicle 102 includes a DC power source 108, for example, a battery, fuel cell system, and/or super-capacitor, which is electrically coupled to the motor 104 by way of a motor controller 110, such as an analog circuit, digital circuit and/or programmed microprocessor. The motor controller 110 embodies control logic for supplying the torque and flux currents to the motor 104 in accordance with various algorithms generally discussed hereinbelow.

GLOSSARY OF SYMBOLS

Figure 2:
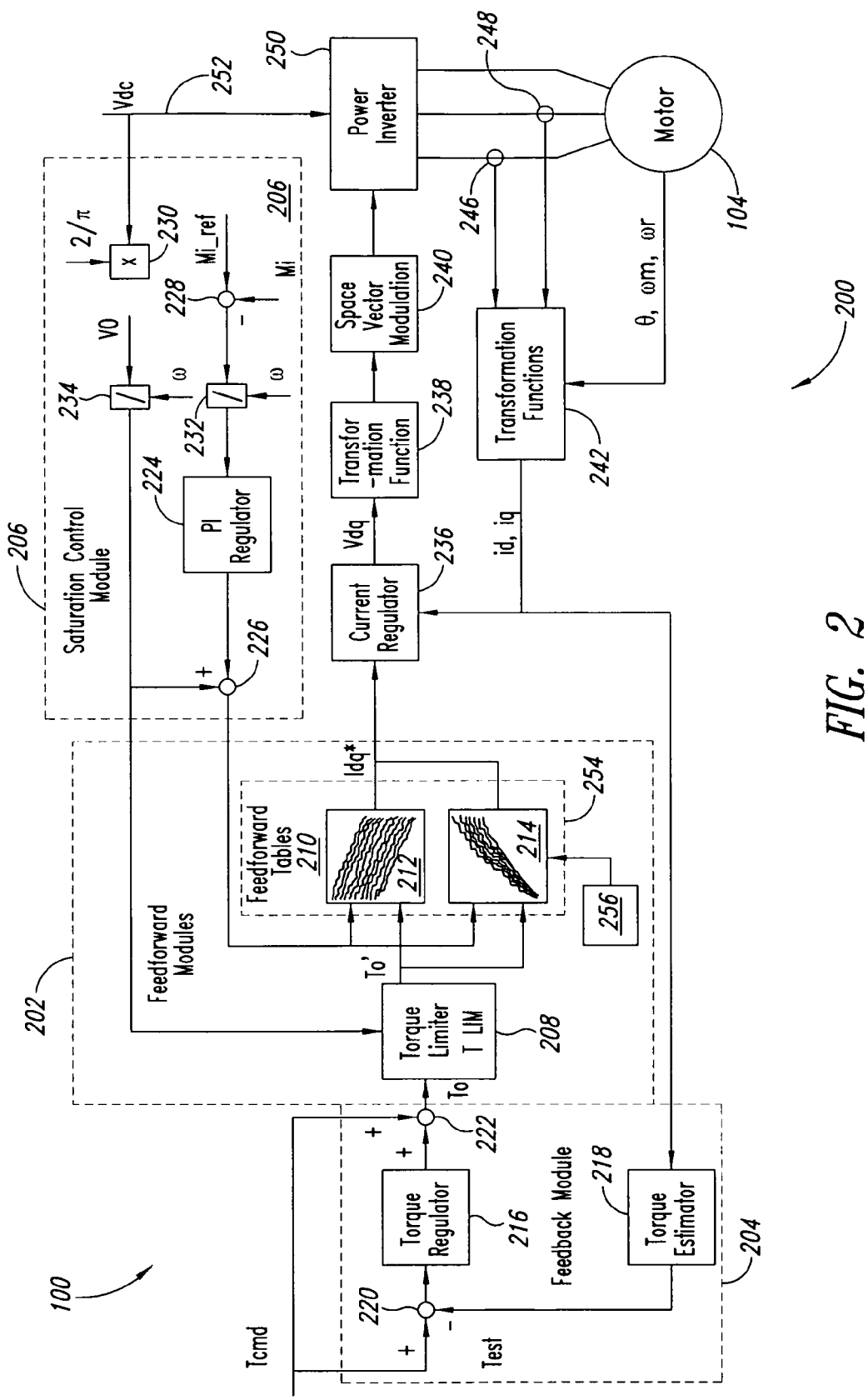
FIG. 2 is a block diagram of an exemplary embodiment of a motor control system which converts direct current (DC) power into alternating current (AC) power to drive the motor.

The following symbols, related to a PM motor, appear in the description that follows:

$i_d$=direct-axis (d-axis) stator current
$i_q$=quadrature-axis (q-axis) stator current
$i_{dq}$=d-axis and q-axis current
$i_d^*$=direct-axis current signal
$i_q^*$=quadrature-axis current signal
$i_{dq}^*$=d-axis and q-axis current signal
$L_d$=d-axis stator inductance
$L_q$=q-axis stator inductance
P=number of pole pairs of the motor
p=operator indicating mathematical differentiation with respect to time
$r_s$=stator resistance
T=PM motor generated airgap torque
$T_L$=load torque
$V_{DC}$=DC bus voltage
$v_o$=operating motor voltage
$V_o$=maximum motor voltage
$\lambda_{ds}$=d-axis stator flux linkage
$\lambda_{qs}$=q-axis stator flux linkage
$\lambda_{PM}$=permanent magnet flux linkage
$\lambda_o$=operating flux linkage
$v_{ds}$=d-axis stator voltage
$v_{qs}$=q-axis stator voltage
$\omega_r$=electric angular speed
$\theta_{rm}$=rotor mechanical speed
$\gamma$=flux linkage Motor Control FIG. 2 is a block diagram of an exemplary embodiment of a motor control system 200 controlling the conversion of direct current (DC) power into alternating current (AC) power to drive the motor 104. The exemplary embodiment of the motor control system 200 comprises a feedforward module 202, a feedback module 204, and a saturation control module 206.

The feedforward module 202 comprises a torque limiter 208 and feedforward direct-axis and quadrature-axis current signal ($i_{dq}^*$) based upon the direct-axis and quadrature-axis information in feedforward table 210. Feedforward $i_{dq}^*$ determined signal from the feedforward direct-axis and quadrature-axis table 210 comprises a feedforward direct-axis signal ($i_d^*$) based upon the direct-axis table information 212 and a feedforward quadrature-axis signal ($i_q^*$) based upon the quadrature-axis table information 214. The current signals $i_d^*$ and $i_q^*$ may be collectively referred to with the term $i_{dq}^*$ for convenience. Similarly, the currents $i_d$ and $i_q$ may be collectively referred to as $i_{dq}$ for convenience. This information is described in greater detail hereinbelow.

Feedback module 204 comprises a torque regulator 216, a torque estimator 218, a first summing junction 220, and a second summing junction 222. The torque estimator 218 receives the measured motor currents ($i_d$ and $i_q$) and estimates motor torque ($T_{est}$).

An exemplary saturation control module 206 comprises a proportional integrator (PI) regulator 224, a first summing junction 226, a second summing junction 228, a multiplier junction 230, and division junctions 232, 234. Other embodiments of the saturation control module 206 may be used by alternative embodiments of a motor control system 200. Various possible implementation of the saturation control module 206 are known in the art and are not described in detail herein for brevity.

Other components of the motor control system 200 include a current regulator 236, a first transformation function device 238, a space vector modulation block 240, a second transformation function device 242, current transformers 246, 248, and a power inverter 250. The processes performed by these devices are described in greater detail hereinbelow with respect to at least their functionality within the operation of the torque feedforward compensation system 100. In alternative embodiments, these components may be arranged in a different order, some components may be omitted, and/or other components (not shown) may be added. Implementation of such devices are known in the art and are not described in detail herein for brevity.

Various signals, such as actual motor input phase currents, motor rotor position/speed ($\theta_{rm}$ and/or $\omega_r$), and DC bus voltage ($V_{dc}$), are sensed and processed by the motor control system 200. Sensing the above-described signals and converting them into data formats suitable for use by the motor control system 200 is generically illustrated by the transformation function device 242. Any suitable sensors or transducers may be used, such as the non-limiting, exemplary current transformers 246, 248. In this exemplary embodiment, current transformers 246, 248 sense the AC current from the power inverter that powers the motor 104, and thereby provide the inputs to the transformation function device 242. Such sensors or transducers, and the associated information conversions performed by the transformation function device 242, are well known and are not described herein for brevity.

Feedforward module 202 receives a torque command ($T_{cmd}$) signal. The torque command ($T_{cmd}$) signal corresponds to a desired operating function that is to be performed by motor 104, such as acceleration of vehicle 102 (FIG. 1). The torque command ($T_{cmd}$) signal is received by the summing junction 222 and combined with the output of the torque regulator 216, described in greater detail below. The output $T_o$ is provided to the feedforward direct-axis and quadrature-axis current information in feedforward table 210, via the torque limiter 208 (described in greater detail below).

The feedforward direct-axis and quadrature-axis current information in feedforward table 210 is used to generate a current signal ($i_{dq}^*$), wherein the current signal $i_{dq}^*$ includes $i_d^*$ and $i_q^*$ current signal components. The current command signals $i_{dq}^*$ (control signals, $i_d^*$ and $i_q^*$) are inputs into the current regulator 236 to operate the power inverter 250. The power inverter control signals are generated by the current regulator 236, the transformation function device 238, the space vector modulation block 240, and/or other components (not shown) associated with generating signals suitable for controlling power inverter 250. The above-described current signals $i_{dq}^*$, $i_d^*$, and $i_q^*$ may be alternatively referred to as signal commands $i_{dq}^*$, $i_d^*$, and $i_q^*$ for convenience.

As noted above, feedback module 204 monitors input and output parameters of the motor 104 during operation. The transformation function device 238 receives information corresponding to the AC phase currents of the motor 104, and determines the measured currents $i_d$ and $i_q$ therefrom. Information corresponding to the determined measured currents $i_d$ and $i_q$ is communicated to the torque estimator 218 and current regulator 236.

The torque estimator 218 estimates torque output of the motor 104 in accordance with equation (5) below. Alternative embodiments may use other suitable torque estimation algorithms. Such known torque estimation algorithms are not described herein for brevity. Output to the torque estimator 218 ($T_{est}$) is communicated to the summing junction 220.

First summing junction 220 sums the $T_{cmd}$ and $T_{est}$ signals, and determines an error signal ($T_{err}$) which is communicated to the torque regulator 216. The torque regulator 216 output is summed with $T_{cmd}$ at the second summing junction 222, and the output $T_o$ is provided to the torque limiter 208. Accordingly, if the estimated torque is not at least substantially equal to the torque command ($T_{cmd}$), the feedback module 204 effects a correction so that the actual torque of motor 104, as estimated by the torque estimator 218, is modified to be substantially equal to the torque command ($T_{cmd}$).

Physical and/or electrical constraints of the motor 104, such as limits on the power output and motor speed, and limits to the DC voltage on the DC bus 252, effectively limit torque output of motor 104. Limits to torque output are imposed by the torque limiter 208, which limits torque to a predefined torque limit. In some embodiments, the torque limit may be a variable limit based upon operating conditions of the motor 104 and/or other components of the torque feedforward compensation system 100. If the input $T_o$ is less than a maximum output torque or torque limit, the output ($T_o'$) of the torque limiter 208 is equal to $T_o$. However, if the input $T_o$ is greater than or equal to the maximum output torque or torque limit, the output ($T_o'$) of the torque limiter 208 is limited to a torque limit ($T_{lim}$). Accordingly, output ($T_o'$) of the torque limiter 208 is the lesser of either the $T_o$ from the second summing junction 222 or the torque limit ($T_{lim}$).

As described hereinbelow in greater detail, the feedforward direct-axis and quadrature-axis current information in feedforward table 210 is generated based on various parameters of motor 104, the current limit curve 308 (FIG. 3), the maximum torque per voltage (MTPV) curve 310, and the peak torque per ampere (PTPA) curve 312. The graph 212 is illustrated for convenience as a graphical representation of the direct-axis current feedforward current information, from which the signal $i_d^*$ is determined. Similarly, the graph 214 is illustrated for convenience as a graphical representation of the quadrature-axis current feedforward information, from which the signal $i_q^*$ is determined.

The feedforward information 212, 214 is conceptually illustrated as three-dimensional graphs for illustrative purposes and to conceptually describe operation of the various embodiments of the torque feedforward compensation system 100. Feedforward information 212, 214 may be implemented as a predefined feedforward table or the like in preferred embodiments, may be implemented as real-time or near real-time algorithms in other embodiments, or may be implemented as the illustrated graphs in yet other embodiments.

It will be appreciated that the feedforward direct-axis current information 212 and the feedforward quadrature-axis current information 214 may be implemented in any suitable format and/or methodology. Information 212, 214 may reside in any suitable memory medium 254. Information residing therein may be retrieved and executed by any suitable processor or processing system 256, including state machines or the like, when the various operations are performed in accordance with the embodiments described herein. Such systems and methods for storing data, and the associated retrieving and processing of the information therein, are known and are not described herein for brevity.

Current regulator 236 receives the determined signal $i_{dq}^*$ (d-axis and q-axis current signals), and currents $i_d$ and $i_q$ (current feedback). Current regulator 236 converts the information into a commanded voltage ($V_{dq}$). $V_{dq}$ is based on a suitable motor model of motor 104, and may be used for steady-state voltage output control. The PI regulator 224, described in greater detail below, may be used for transient current regulation and steady state regulation due to parameter errors. Ideally in steady state, the PI regulator 224 output is close to zero, and the feedforward voltage output from the feedforward module 202 controls the motor 104 by providing the commanded torque/power, via $V_{dq}$.

The saturation control module 206 also prevents output of current regulator 236 from deep saturation that would otherwise slow down the current/torque dynamic responses of the motor 104 and introduce harmonic distortion in the motor current and voltage. The PI regulator 224 regulates a modulation index to the commanded level at high motor speed when the voltage limit is reached. The output of the PI regulator 224 reduces the flux signal input to the feedforward direct-axis and quadrature-axis current information in feedforward table 210, which shrinks the voltage ellipse (described in greater detail hereinbelow), and consequently, reduces the modulation index output.

Motor d-q Model

When the rotor of motor 104 rotates synchronously with an electrical angular speed $\omega_r$, the flux linkage and the voltage equation of motor 104 may be expressed as follows:

$$v_{ds} = r_s i_{ds} + p\lambda_{ds} - \omega_r \lambda_{qs} \quad (1)$$

$$v_{qs} = r_s i_{qs} + p\lambda_{qs} + \omega_r \lambda_{ds} \quad (2)$$

where $$\lambda_{ds} = L_d i_{ds} + \lambda_{PM} \quad (3)$$

$$\lambda_{qs} = L_q i_{qs}. \quad (4)$$

The equation for electromagnetic motor torque may be expressed as follows:

$$T_{em} = (3P/2)(\lambda_{PM} i_q + i_d i_q (L_d - L_q)) \quad (5)$$

$L_d$ and $L_q$ are stator d-axis and q-axis inductance, $r_s$ is the stator resistance, $\lambda_{PM}$ is permanent magnet flux linkage, and P is the number of pole pairs of the motor 104. In one embodiment, the motor torque equation (5) is implemented in a processing system such that an estimated motor torque ($T_{est}$, FIG. 2) is computationally determined on a real-time, or near real-time, basis, based upon the determined $i_d$ and $i_q$ of motor 104. For example, $i_d$ and $i_q$ of motor 104 may be determined from input current sensed by current transformers 246, 248.

Basic Equations and Boundaries

The following describes basic equations and boundaries relevant to defining or determining operation of various embodiments of the motor control system 200. Description of the equations and boundaries are limited for brevity. An exemplary source of the basic equations and boundaries described herein may be found in "Design Analysis and Control of Interior PM Synchronous Machines," Tutorial Course Notes, IEEE IAS, Oct. 3, 2004, which is incorporated herein by reference in its entirety.

Voltage Ellipse Equation

In steady state, the transient changes of the motor current can be ignored. Also, motor stator resistance in equation (1) and (2) can be ignored. Accordingly, the magnitude of the motor voltage (square for convenience) is:

$$v_0^2 = v_{ds}^2 + v_{qs}^2 = \omega_r^2 (L_q^2 i_{qs}^2 + (L_d i_{ds} + \lambda_{PM})^2). \quad (6)$$

For a given DC bus voltage, $V_{dc}$, the maximum output AC voltage is $V_0 = 2V_{dc}/\pi$. Therefore the voltage ellipse equation is:

$$\frac{(i_{ds} + \lambda_{PM}/L_d)^2}{(\gamma/L_d)^2} + \frac{i_{qs}^2}{(\gamma/L_q)^2} = 1 \quad (7)$$

where the flux linkage is $\gamma = V_0/\omega$.

Current Limit Circle

Output current is limited by $i_{max}$, $$i_{max}^2 = i_{ds}^2 + i_{qs}^2. \quad (8)$$

Peak Torque Per Ampere (PTPA) Curve

For a given torque, T, the minimum current is the shortest distance from the torque curve to the origin. The peak torque per ampere (PTPA) curve is:

$$i_d = \frac{\lambda_{PM}}{2(L_q - L_d)} - \sqrt{\frac{\lambda_{PM}^2}{4(L_q - L_d)^2} + i_q^2} \quad (9)$$

Maximum Torque Per Voltage (MTPV) Control

For a given flux linkage magnitude, $|\lambda_{dq}| = \sqrt{\lambda_d^2 + \lambda_q^2}$, using the equations (3) and (4), $i_d$ may be calculated as follows:

$$i_d = -\frac{\lambda_{PM} + \lambda_d}{L_d}, \quad i_q = \frac{\sqrt{\lambda_0^2 - \lambda_d^2}}{L_q} \quad (10)$$

To maximize the torque with respect to $\lambda_d$, $$\lambda_d = \frac{-L_q \lambda_{PM} + \sqrt{(L_q \lambda_{PM})^2 + 8(L_q - L_d)^2 \lambda_0^2}}{4(L_q - L_d)} \quad (11)$$

Notice that for a given motor speed, $\omega_r$, and DC bus voltage, $V_{dc}$, the flux linkage is:

$$\lambda_0 = \frac{2V_{dc}}{\pi \omega_r}. \quad (12)$$

Feedforward Current Information

Figure 3:
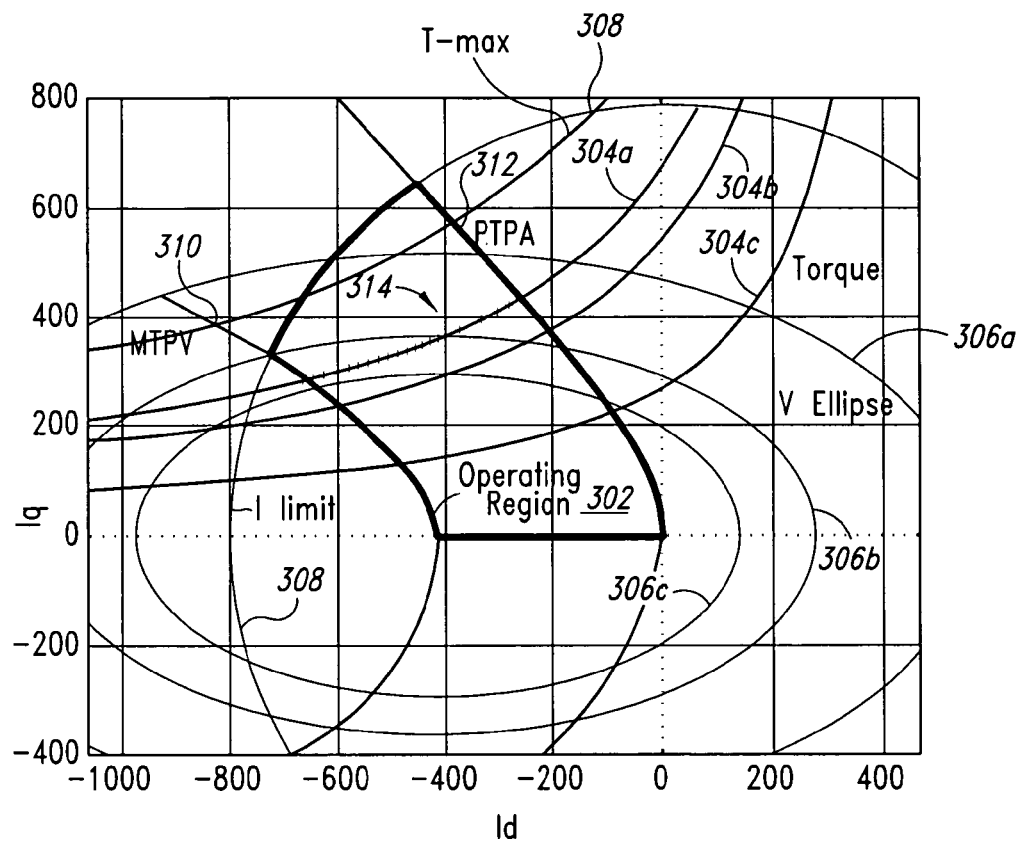
FIG. 3 is a graph depicting the equations and boundaries defining an operating range for the feedforward controls based upon constant motor parameters.

FIG. 3 is a graph 300 depicting the equations and boundaries defining an operating range for the currents, $i_d$ and $i_q$, based upon an assumption of constant motor parameters. The operating region 302 corresponds to an exemplary operating range for the current $i_{dq}$ for various commanded torque and flux linkage. Illustrated are exemplary torque curves 304a-304c, a plurality of exemplary voltage ellipses 306a-306c, an exemplary current limit (I Limit) curve 308, an exemplary maximum torque per voltage (MTPV) curve 310, and an exemplary peak torque per ampere (PTPA) curve 312. Accordingly, the operating region 302 is bounded by the current limit curve 308, the MTPV curve 310 and the PTPA curve 312.

As noted in equation (7), if all the motor parameters are fixed (and presumed linear for purposes of FIG. 3), then the ellipses are only parameter functions of the flux linkage $\gamma = V_0/\omega$. The center of the ellipses is at $(-\lambda_{PM}/L_d, 0)$, and the semi-major and semi-minor axes are $\gamma/L_d$ and $\gamma/L_q$.

For every given torque, DC bus voltage, and motor speed, FIG. 3 illustrates that there exist a torque curve and a voltage ellipse curve. The torque curve intercepts with the voltage ellipse and the boundaries, such as the PTPA curve, the MTPV curve, and the current limit circle. FIG. 3 illustrates various currents $i_d$ and $i_q$ for the reference torque input (Newton-meters, Nm) and flux linkage level (Weber). The intersection points of the various curves illustrated in FIG. 3 defining desirable operating parameters are calculated, and treated as follows:

The torque curve has a single intersection with each of PTPA (id_t_ptpa, iq_t_ptpa) and MTPV (id_t_mtpv, iq_t_mtpv) curves.

If a proper torque range is specified, the torque range always has two intersection points with the current limit circle, except one point, which is the intersection point of PTPA and the current limit circle. At this point, the torque reaches its maximum. Among the two points, only the left side one (id_t_lim, iq_t_lim) is used for the feedforward current information determination.

Depending on the flux linkage input value, the torque curve can have one, two, or no intersection point(s) with the voltage ellipse. If the torque curve has only one intersection, from the definition of MTPV curve, the torque curve should meet the MTPV curve at the same time. If the torque curve has two intersection points, only the right side intersection point (id_t_v, iq_t_v) is used for the feedforward current information determination, because they are separated by the MTPV curve.

An additional intersection point, the intersection between MTPV and the PTPA (id_t_ptpa, iq_t_ptpa) curve will be used for the feedforward current information determination later.

Depending on the flux level, the voltage ellipses have one or no intersections with the current limit circle. In the case of one intersection with the current limit circle, it generates the current output limit, id_v_lim, for that specific flux level.

With the above definitions of the intersection points, the outputs from the feedforward direct-axis and quadrature-axis current information in feedforward table 210 should be inside the operating region 302, as illustrated in FIG. 3. For example, the torque curve 304a and different voltage ellipses, bounded by the MTPV and PTPA curves, yield the outputs shown with "+" symbols 314.

With respect to the quadrature-axis current $i_q$ of the graph 300, the voltage ellipses 306 and the voltage limit 308 are symmetric around the x-axis (direct-axis current $i_d$). Depending upon the operating conditions, the torque reference value can be either positive or negative. If the torque reference value is negative, the output from the feedforward direct-axis and quadrature-axis tables 210 would have a negative quadrature current $i_q$ value. That is, if the commanded torque is negative, a negative sign for the quadrature current $i_q$ results. In one embodiment, to simplify the calculations of the feedforward direct-axis and quadrature-axis tables 210, only positive quadrature current $i_q$ values are considered.

Figure 4:
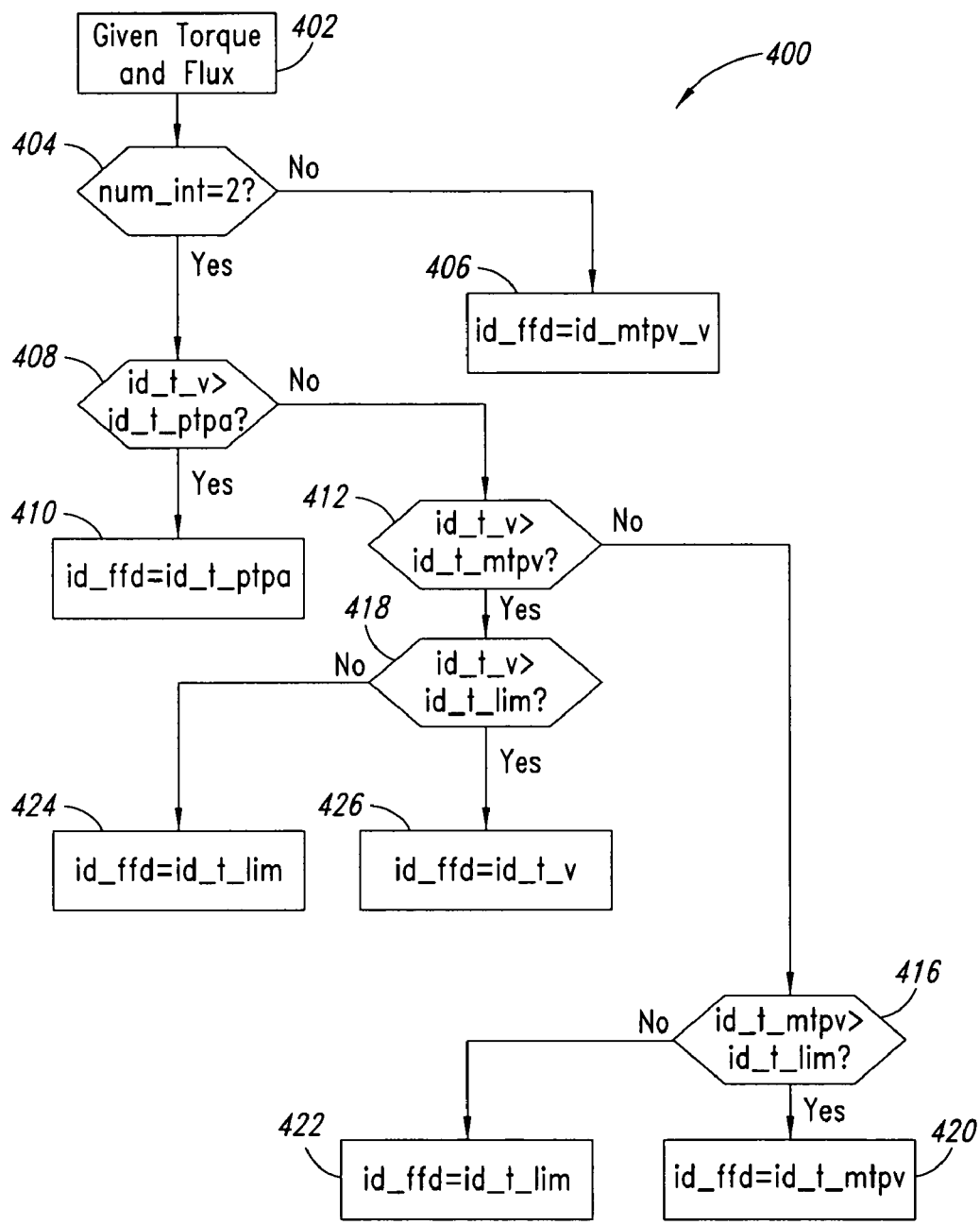
FIG. 4 is a flow chart illustrating operating parameter calculations based upon the feedforward information of FIG. 2.

FIG. 4 is a flow chart 400 illustrating operating parameter calculations based upon the feedforward direct-axis and quadrature-axis current information 210 (FIG. 2). The flow chart 400 shows the architecture, functionality, and operation of a possible implementation of software for implementing operation of the torque feedforward compensation system 100. In this regard, each block may represent a module, segment, or portion of code that comprises one or more executable instructions for implementing the specified logical function(s). It should also be noted that in some alternative implementations, the functions noted in the blocks may occur out of the order noted in FIG. 4, may include additional functions, and/or may omit some functions. For example, two blocks shown in succession in FIG. 4 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included within the scope of this disclosure.

With respect to FIG. 4, the term "num_int" corresponds to the number of intersection points between a voltage ellipse 306 (FIG. 3) and the commanded torque curve. The term "id" corresponds to the direct-axis current $i_d$. The terms "mtpv" and "ptpa" correspond to the above-described MTPV curve 310 and the PTPA curve 312, respectively. The term "t" corresponds to torque, the term "v" corresponds to a voltage ellipse 306, the term "ffd" corresponds to a feedforward, and the term "lim" corresponds to the current limit circle 308.

For example, the term "id_t_v" corresponds to the direct-axis current $i_d$ at a point where torque intercepts the voltage ellipse. The term "id_t_ptpa" corresponds to the direct-axis current $i_d$ at a point where torque intercepts the PTPA curve. Similarly, the term "id_t_mtpv" corresponds to the direct-axis current $i_d$ at a point where torque intercepts the MTPV curve.

For a given DC bus voltage and motor speed, and therefore a given flux and commanded torque, the process starts at block 402. The number of intersection points are checked at block 404. If the number of intersection points at block 404 is one or zero (the No condition), the direct-axis current $i_d$ is found at the intersection of the MTPV curve and the voltage ellipse at block 406. When no intersection is found, the torque command is too large to produce. At this flux condition, the maximum torque that can be produced is at the same point where the voltage ellipse intersects with the MTPV curve. The resultant current $i_d$ is the same as in the case of the intersection point. However, if at block 402 the number of intersection points is two (the Yes condition), the process proceeds to block 408.

At block 408, if the direct-axis current $i_d$ at the point where torque intercepts the voltage ellipse is greater than or equal to a point for a direct-axis current $i_d$ where torque intercepts the PTPA curve (the Yes condition), the process proceeds to block 410 where the direct-axis current $i_d$ is found at the intersection of the torque curve and the PTPA curve. (In situations where the torque curve has two intersections with the voltage ellipse from the definition of the MTPV, the two points are separated by the corresponding MTPV line. Accordingly, for the same torque with the smaller current, id_t_v uses the point on the right side of MTPV.) However, if at block 408 the direct-axis current $i_d$ at the point where torque intercepts the voltage ellipse is less than or equal to a point for the direct-axis current $i_d$ where torque intercepts the PTPA curve (the No condition), the process proceeds to block 412.

At block 412, if the intersection of the torque and the voltage ellipse is greater than or equal to a point for a direct-axis current $i_d$ where torque intercepts the MTPV curve (the Yes condition), the process proceeds to block 418. If the intersection of the torque and the voltage ellipse is less than the point for the direct-axis current $i_d$ where torque intercepts the MTPV curve (the No condition), the process proceeds to block 416.

At block 416, if the direct-axis current $i_d$ at the point where torque intercepts the MTPV curve is greater than a point for a direct-axis current $i_d$ where torque intercepts the current limit circle (the No condition), the process proceeds to block 420 where the direct-axis current $i_d$ is found at the intersection of the torque curve and the MTPV curve. However, if at block 416 the direct-axis current $i_d$ at the point where torque intercepts the MTPV curve is less than or equal to a point for the direct-axis current $i_d$ where torque intercepts the current limit circle (the Yes condition), the process proceeds to block 422 where the direct-axis current $i_d$ is found at the intersection of the torque curve and the current limit circle.

Returning to block 418, if the direct-axis current $i_d$ at the point where torque intercepts the voltage ellipse curve is less than or equal to a point for a direct-axis current $i_d$ where torque intercepts the current limit circle (the No condition), the process proceeds to block 424 where the direct-axis current $i_d$ is found at the intersection of the torque curve and the current limit circle. However, if at block 418 the direct-axis current $i_d$ at the point where torque intercepts the voltage ellipse is greater than a point for the direct-axis current $i_d$ where torque intercepts the current limit circle (the Yes condition), the process proceeds to block 426 where the direct-axis current $i_d$ is found at the intersection of the torque curve and the voltage ellipse.

Of note, with the direct-axis current $i_d$ determined in accordance with the process of FIG. 4, the quadrature-axis current $i_q$ may be determined in accordance with equation (7) above.

The above process illustrated in FIG. 4 is based on the assumption that the motor parameters are constant (linear). However, in reality, motor parameters are not constant. For example, machine inductances have a wide range of change with respect to different motor currents mainly due to the effects of saturation.

Figure 5:
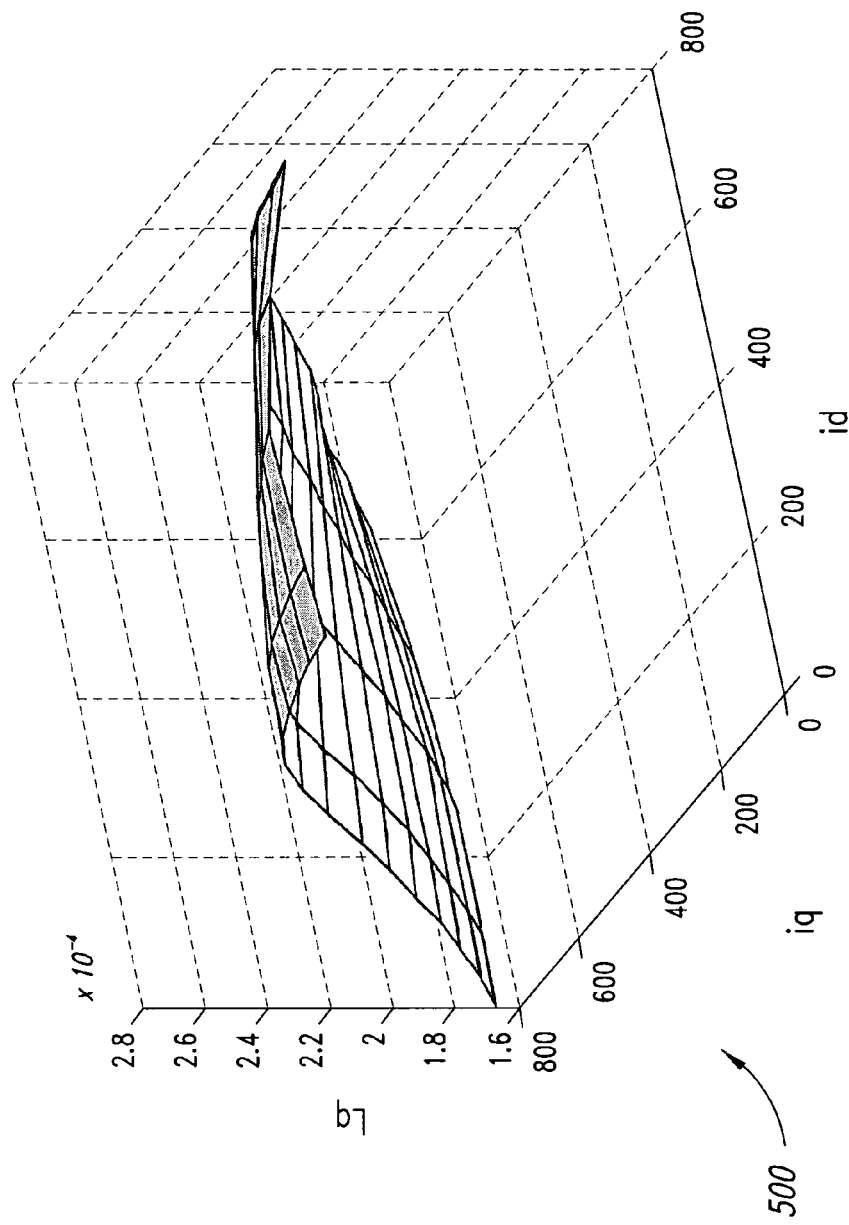
FIG. 5 is a graph illustrating exemplary stator inductance ($L_q$) values within the motor current range.

FIG. 5 is a graph 500 illustrating exemplary stator inductance ($L_q$) values within the motor current range. Similarly, $L_d$ and $\lambda_{PM}$ are also functions of the motor current. Depending on the ways of modeling the parameters of motor 104, the parameters can be analytical functions of $i_d$ and $i_q$. Analytical functions could be nonlinear in some embodiments. The various parameters can alternatively be measured by experiments and saved in the form of lookup tables or the like in other embodiments.

When the motor parameters change over a wide range, close to 40% for $L_q$ as shown in FIG. 5, the optimal curves and boundaries of FIG. 3 may no longer be sufficiently accurate in some embodiments. In such situations, the outputs of the feedforward direct-axis and quadrature-axis current information in feedforward table 210 (FIG. 2) are away from the ideal positions. That is, the motor 104 should operate inside the shaded area shown in FIG. 3. However, the actual outputs of the feedforward direct-axis and quadrature-axis current information in feedforward table 210 might be outside of the operating region 302, or alternatively, the actual outputs of the feedforward direct-axis and quadrature-axis current information in feedforward table 210 could be inside of the operating region 302, but away from the optimal operating points, if nonlinearities exist but are not considered. Operation away from the operating points within the operating region 302 may increase the burden of the current regulator 236, may saturate the output of the current regulator 236, and/or may cause operation in an unstable region.

Nonlinearity Effects

To accommodate the above-described parameter-varying situation, a recursive calculation process may be used by alternative embodiments for the outputs of the feedforward module 202. Various embodiments may assume that the operating parameters of motor 104 can be characterized by analytical expressions, or may alternatively assume the operating parameters of motor 104 can be characterized in a lookup table or the like developed from experimental data.

Recursive calculations may be based upon the following, where f, g and w correspond to any suitable function operating on the direct-axis and quadrature-axis currents:

$$L_d = f(i_d, i_q)$$

$$L_q = g(i_d, i_q)$$

$$\lambda_{PM} = w(i_d, i_q) \quad (13)$$

The model parameters in equations (13) can be as simple as a single variable linear line, a quadratic function or an exponential function. Or, the model parameters can be more complicated, such as multivariable nonlinear functions or the like. The model parameters can also be the interpolation from lookup tables or the like whose data come from real motor testing experiments or simulations such as element analysis.

Figure 6:
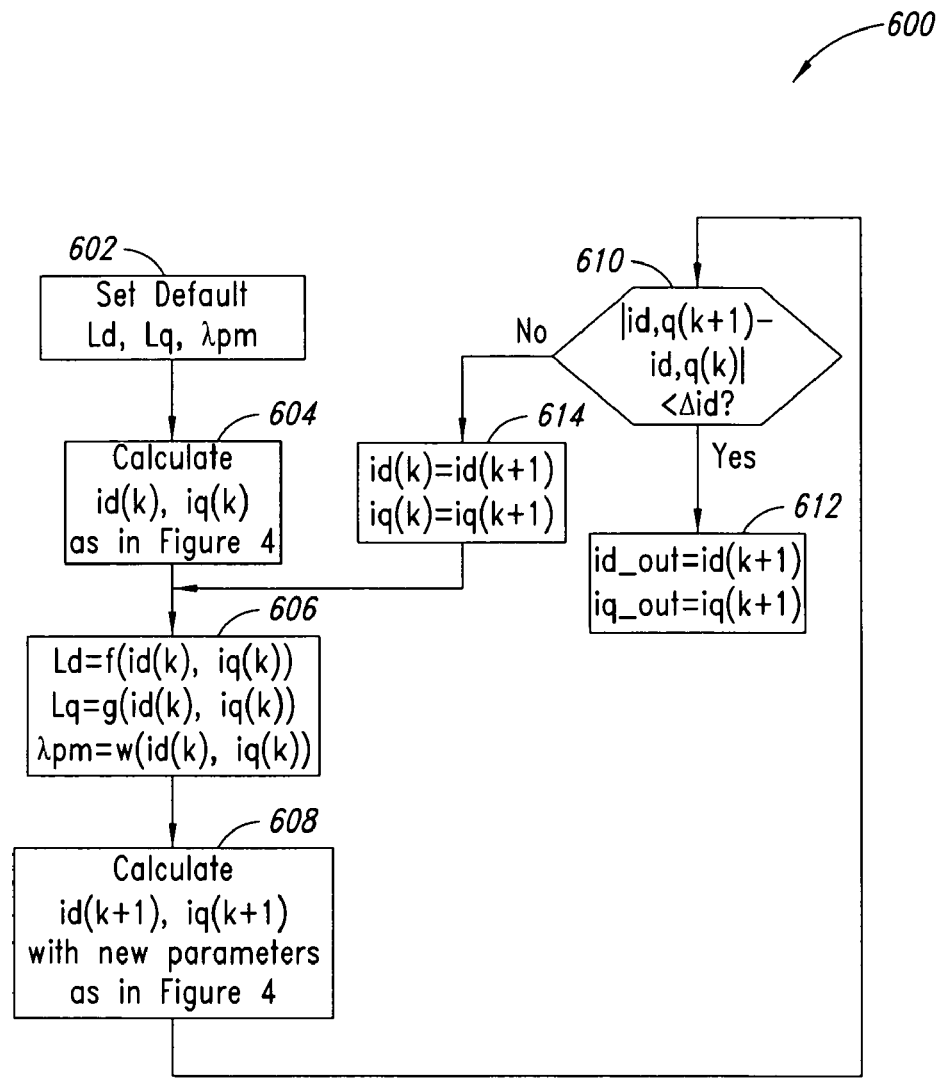
FIG. 6 is a flow chart illustrating a recursive calculation process employed by selected embodiments of the torque feedforward compensation system.

FIG. 6 is a flow chart 600 illustrating a recursive calculation process employed by selected embodiments of the torque feedforward compensation system 100. The flow chart 600 shows the architecture, functionality, and operation of a possible implementation of software for implementing operation of the torque feedforward compensation system 100. In this regard, each block may represent a module, segment, or portion of code that comprises one or more executable instructions for implementing the specified logical function(s). It should also be noted that in some alternative implementations, the functions noted in the blocks may occur out of the order noted in FIG. 6, may include additional functions, and/or may omit some functions. For example, two blocks shown in succession in FIG. 6 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included within the scope of this disclosure.

As shown in the flow chart in FIG. 6, starting from the default motor parameters for a given torque command, motor speed and DC bus voltage, the recursive calculation of the feedforward outputs follows the following steps. The process starts at block 602, where defaults for $L_d$, $L_q$ and $\lambda_{PM}$ are set. One set of feedforward outputs, $i_d$ and $i_q$, are calculated at block 604 as described above and illustrated in FIG. 4. Using equation (13), at block 606, the motor parameters are calculated with the current outputs determined from block 604. One set of feedforward outputs, as described in FIG. 4, with new motor parameters from block 606, is calculated at block 608. If the output errors are within tolerances at block 610 (the YES condition), optimal outputs are obtained at block 612. If not (the NO condition), the process goes to block 614 to calculate new currents $i_d$ and $i_q$. It is appreciated that the above recursive calculations of the flow chart 600 apply to all the boundaries and curves illustrated in FIG. 3.

In some embodiments, the recursive calculations of FIG. 6 are performed off-line as part of the process of computationally determining the feedforward direct-axis and quadrature-axis current information in feedforward table 210. In other embodiments, the recursive calculations may be performed on-line as the feedforward direct-axis and quadrature-axis current information in feedforward table 210 are computationally determined in real time.

The above-described operating region 302 (FIG. 3) was derived under an assumption of parameter linearity. That is, feedforward module 202 generates the above-described current signal ($i_{dq}^*$, which includes the ideal $i_d^*$ and $i_q$ current signal components). As described above, the determined current signals $i_d^*$ and $i_q^*$ components are ideal values since the motor parameters used to derive the feedforward direct-axis and quadrature-axis current information in feedforward table 210 were assumed to be constants. However, in practical applications, motor parameters are not linear and vary.

Figure 7:
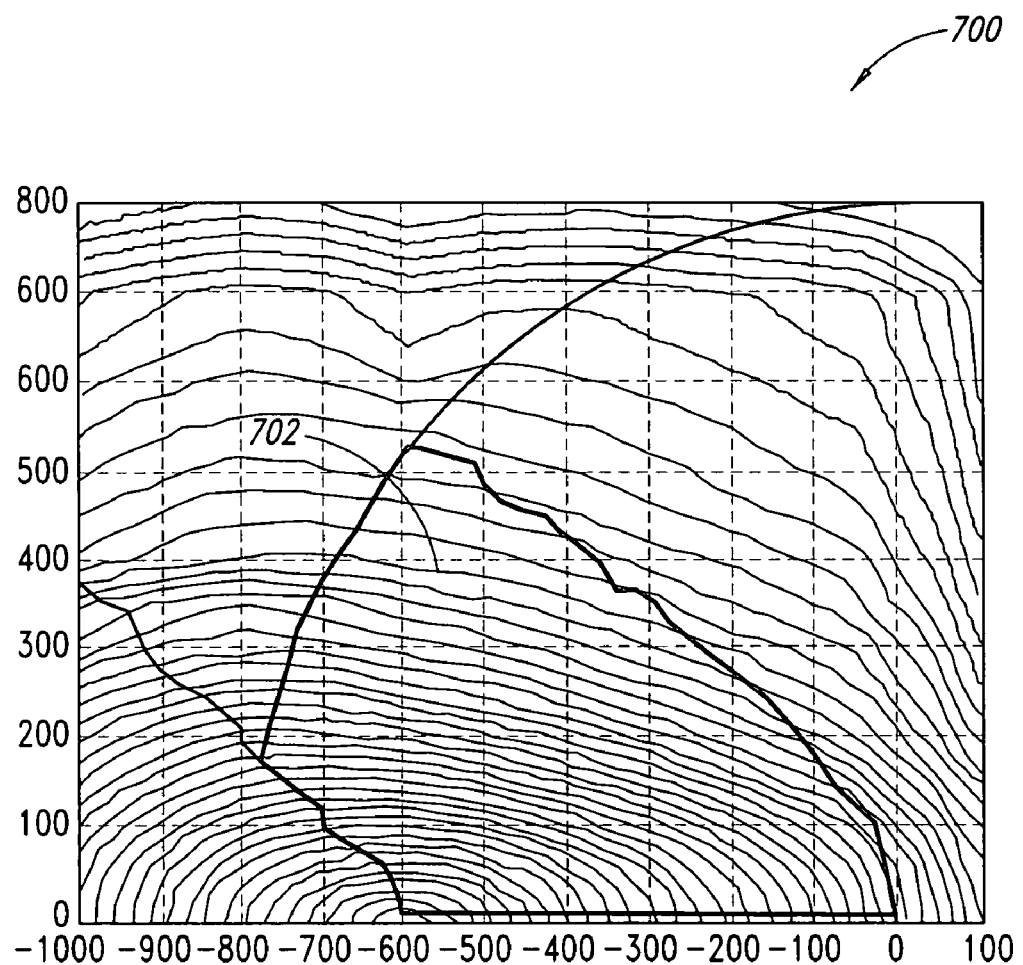
FIG. 7 is a graph depicting the equations and boundaries defining an operating range for the current signals based upon tested motor parameters.

With experimentally measured (tested) motor parameters or computed motor parameters, the voltage ellipses 306 illustrated in FIG. 3 are no longer "regular" ellipses as illustrated in FIG. 3 (which are based upon theoretical models and theoretical constant motor parameters). FIG. 7 is a graph depicting the equations and boundaries defining an operating range for the determined current signal ($i_{dq}^*$, which includes $i_d^*$ and $i_q^*$ signal components) when the feedforward direct-axis and quadrature-axis current information in feedforward table 210 is based upon at least a tested direct-axis stator inductance, a tested quadrature-axis stator inductance, and a tested permanent magnet flux linkage. The new operating region 702 is the counterpart for the constant parameter operating region 302 in FIG. 3.

Resultant Current Information

Figure 8:
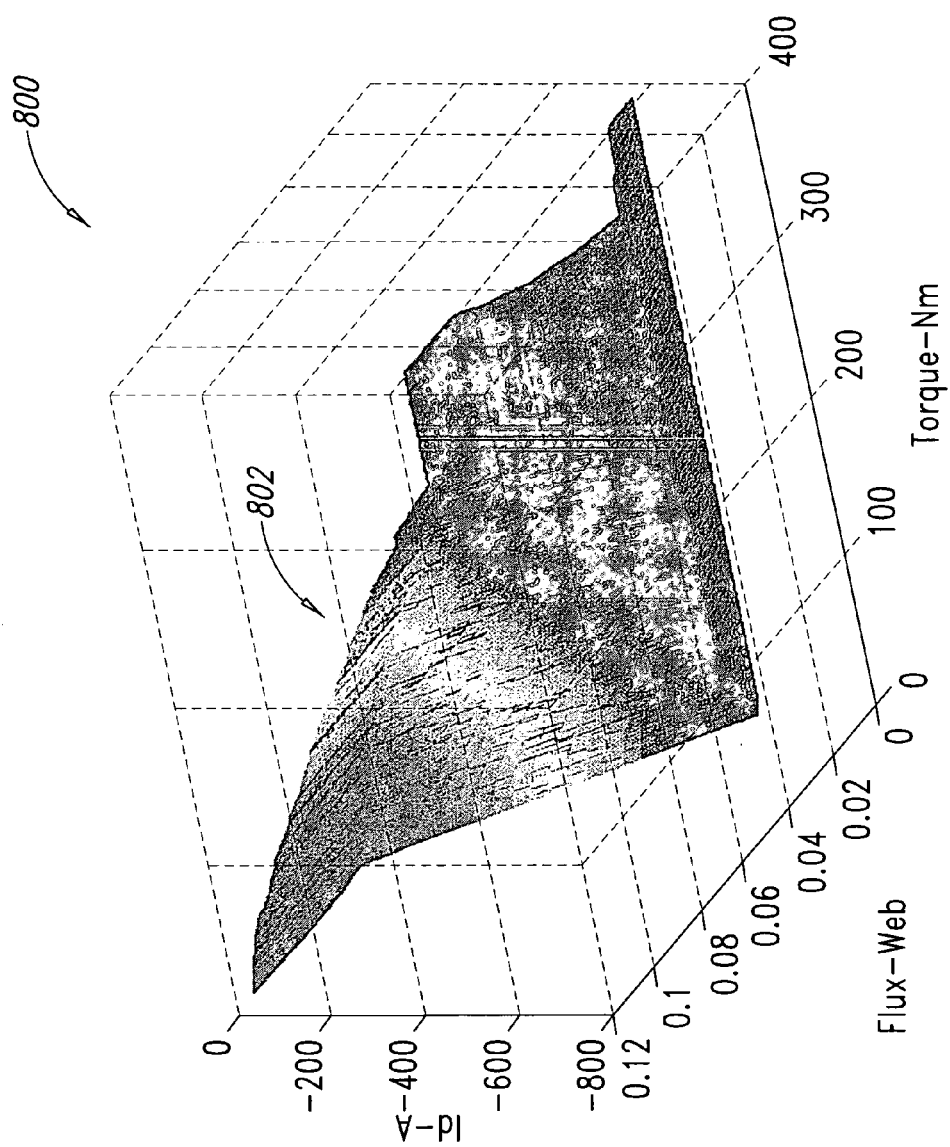
FIG. 8 is an exemplary two-dimensional, graphical representation of the feedforward direct-axis current information, graphically represented as a three-dimensional surface.
Figure 9:
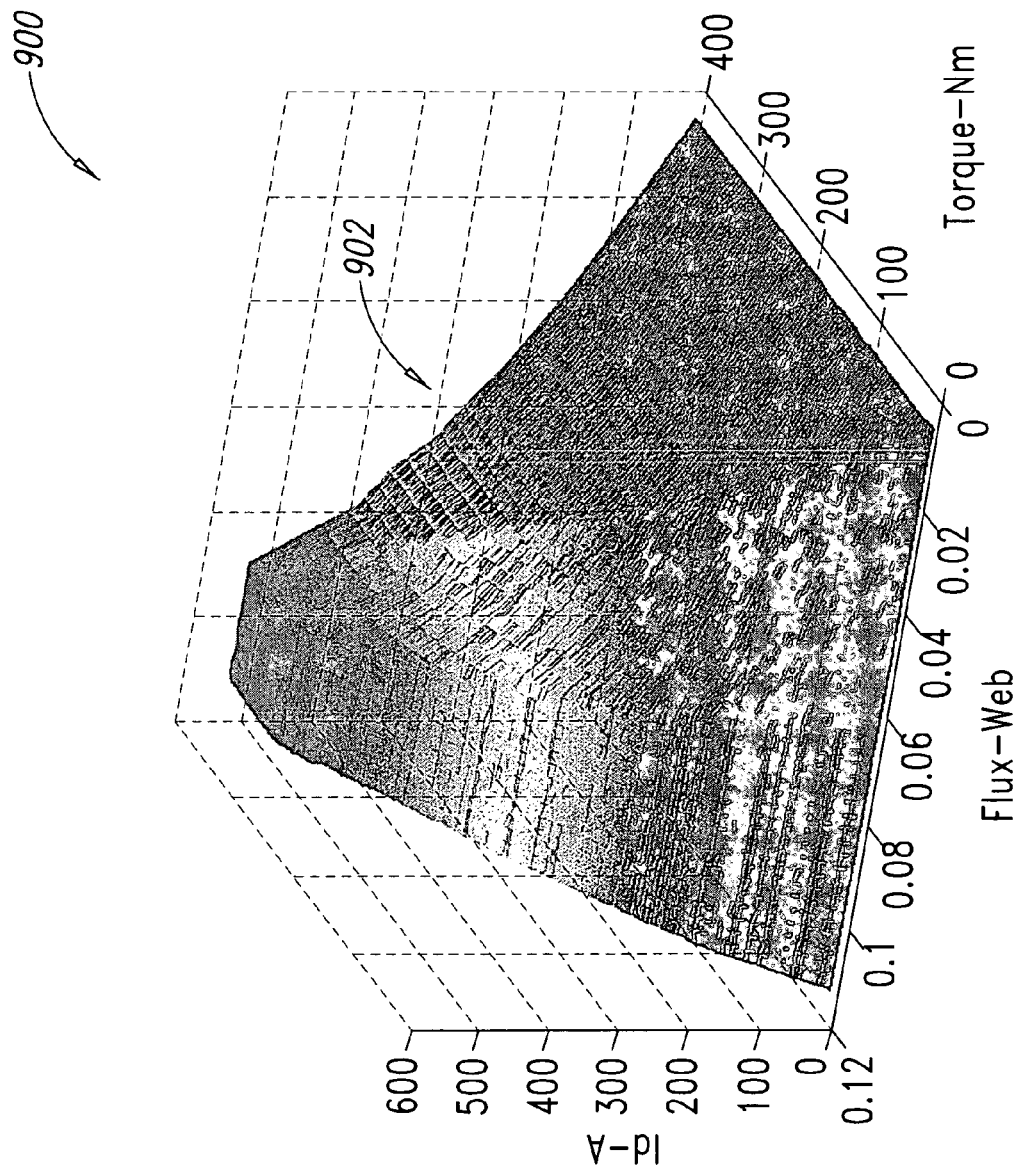
FIG. 9 is an exemplary two-dimensional, graphical representation of the feedforward quadrature-axis current information, graphically represented as a three-dimensional surface.

FIG. 8 is an exemplary two-dimensional, graphical representation 800 of the feedforward direct-axis current information, graphically represented as a three-dimensional surface 802 (corresponding to the graphical representation of the feedforward direct-axis current information 212 in FIG. 2). Similarly, FIG. 9 is an exemplary two-dimensional, graphical representation 900 of the feedforward quadrature-axis current information, graphically represented as a three-dimensional surface 902 (corresponding to the graphical representation of the feedforward quadrature-axis current information 214 in FIG. 2). The graphical representation 800 of the feedforward direct-axis current information, and/or the graphical representation 900 of the feedforward quadrature-axis current information, may be based upon the information illustrated in FIG. 3 in some embodiments, or upon the information illustrated in FIG. 7 in other embodiments.

Embodiments of the torque feedforward compensation system 100 analytically generate the feedforward direct-axis current information for $i_d$ and the quadrature-axis current feedforward information for $i_q$ using torque and flux inputs and known motor parameters $L_d$, $L_q$ and $\lambda_{PM}$. For example, the above-described voltage ellipse 306a-306c (see, for example, equation (6) and FIG. 3), PTPA curve 312, MTPV curve 310, and torque curve 304 are computationally determinable. The motor parameters $L_d$, $L_q$ and $\lambda_{PM}$ may be obtained from test data and/or theoretical (design) information. Accordingly, the operating region 302 is computationally determinable (FIG. 3 indicates the operating region 302 is bounded by the current limit circle 308, the MTPV curve 310, and the PTPA curve 312). Based upon actual operating conditions, the operating points ($i_d$ and $i_q$) can be optimized or selected by the torque feedforward compensation system 100 for a specified torque command ($T_{cmd}$, see FIG. 2), DC bus voltage, and motor speed. In contrast, prior art feedforward tables were derived from a tedious, experimental testing of the motor over many thousands of operating points that include different motor speeds, voltage levels, currents, and torques.

Torque Regulator and Torque Regulator Limits

Feedforward control effected by embodiments of the torque feedforward compensation system 100 improves the motor control dynamic response. Due to the uncertain nature of the above-described motor parameters, feedforward control may contain steady-state errors. The torque regulator 216 is used in alternative embodiments to dynamically regulate the torque. At each motor speed and given DC bus voltage, torque is also limited by the MTPV curve equations (11) and (12), and by the maximum current limit circle equation (8). The torque limit should not be higher than the maximum torque specified for motor output. Accordingly, the actual torque limits are the intersections between the commanded torques and MTPV curves, and between the commanded torques and the current limit circle. Therefore, when the motor is asked for more torque than it can deliver, the torque limiter 208 will limit the actual torque command and prevent the motor from going into an unstable region of operation.

The above-described parameters used to generate the feedforward direct-axis and quadrature-axis tables 210 (FIG. 2) may not be accurate for the actual operating conditions for a variety of reasons. For example, the parameters may be based upon a representative test machine. Or, the parameters may change under different operating conditions (as contrasted with the parameter determined at a particular operating condition) or change over time. Since the outputs of the feedforward direct-axis and quadrature-axis tables 210 may not be accurate for a particular machine and/or for an actual operating condition, the torque output may be away from the commanded torque. Embodiments of the regulator 216 correct the above-described error and provides a new compensated input signal, $T_o$, to the feedforward direct-axis and quadrature-axis tables 210. That is, the inaccuracies of the parameters are dynamically compensated.

Saturation Control

The outputs of the feedforward direct-axis and quadrature-axis current information in feedforward table 210 (FIG. 2) not only generate optimal current commands, they also push the motor output to its maximum boundaries when the motor 104 is operated at high speed. This will send the PWM output into deep saturation, or into six-step mode. In such situations, depending on the current regulator outputs, saturation effects may slow the current/torque dynamic responses and introduce harmonics for the motor 104. To prevent the deep saturation in steady state operating conditions, a saturation control module 206 is used. The modulation index output, Mi, is compared with the steady state modulation index reference, Mi_ref, and is controlled by a PI regulator 224. If the PWM output tends to go to deep overmodulation, the output of the saturation control module 206 will reduce the flux input, γ, to the feedforward direct-axis and quadrature-axis current information in feedforward table 210. Accordingly, the voltage ellipse, as shown in FIG. 3, will be reduced. As a result, the output voltage and the PWM modulation index will be reduced. Therefore, the motor current regulator 236 will stay out of deep saturation.

When the modulation index is regulated below 100 percent, the actual output power of the motor 104 is reduced. To provide high power output for a fast motor transient response, the saturation control module 206 runs at a slower rate so that it only controls the steady state modulation output. Accordingly, during transients, the current regulator 236 can still go into deep saturation and produce maximum output power for fast dynamic responses.

ALTERNATIVE EMBODIMENTS

Although specific embodiments of, and examples for, the torque feedforward compensation system 100 are described herein for illustrative purposes, various equivalent modifications can be made without departing from the spirit and scope of the disclosure, as will be recognized by those skilled in the relevant art.

The teachings provided herein of the various embodiments can be applied to other motor control systems in addition to the torque feedforward compensation system 100 generally described above. For example, the torque feedforward compensation system 100 may be embodied in software, hardware, and/or firmware. Additionally, or alternatively, many of the methods and processes described above may include optional acts or steps, and additional acts or steps may be added as will be recognized by those skilled in the relevant arts. Further, the acts or steps of many of the methods and processes described above may be executed in a different order, as will be recognized by those skilled in the relevant arts. The torque feedforward compensation system 100 can have a different organization than the illustrated embodiment, combining some functions and/or eliminating some functions.

These and other changes can be made in light of the above-detailed description. In general, in the following claims, the terms used should not be construed to be limiting to the specific embodiments disclosed in the specification and the claims, but should be construed to include all possible embodiments along with the full scope of equivalents to which the claims are entitled. Accordingly, the embodiments are not limited by the disclosure, but instead its scope is to be determined entirely by the following claims.

We claim:

1. A method for controlling a permanent magnet motor, comprising:

receiving a torque command and a flux command;

receiving information corresponding to a direct current (DC) bus voltage and a motor speed;

computationally determining feedforward direct-axis current information and feedforward quadrature-axis current information from a plurality of parameters associated with the permanent magnet motor;

determining a current signal ($i_{dq}*$) based upon at least the requested torque command, the flux command, the DC bus voltage, the motor speed, the feedforward direct-axis current information, and the feedforward quadrature-axis current information; and controlling a power inverter that converts DC power into alternating current (AC) power that is supplied to the permanent magnet motor, such that the permanent magnet motor is operated in accordance with the determined $i_{dq}*$.

2. The method of claim 1 wherein computationally determining feedforward direct-axis current information and feedforward quadrature-axis current information comprises:

computationally determining a direct-axis current feedforward table;

computationally determining a quadrature-axis current feedforward table;

saving the direct-axis current feedforward table and the quadrature-axis current feedforward table in a memory medium; and during operation of the permanent magnet motor, determining the current signal ($i_{dq}*$) based upon the received torque command and the flux command, the feedforward direct-axis current information residing in the direct-axis current feedforward table, and the feedforward quadrature-axis current information residing in the quadrature-axis current feedforward table.

3. The method of claim 1 wherein computationally determining feedforward direct-axis current information and feedforward quadrature-axis current information comprises:

computationally determining the direct-axis current feedforward information during operation of the permanent magnet motor;

computationally determining the quadrature-axis current feedforward information during operation of the permanent magnet motor; and during operation of the permanent magnet motor, determining the current signal ($i_{dq}*$) based upon at least the received torque command, information corresponding to the DC bus voltage and the motor speed, the feedforward direct-axis current information, and the feedforward quadrature-axis current information.

4. The method of claim 1, further comprising:

generating control signals based upon to the determined feedforward direct-axis current information and the feedforward quadrature-axis current information; and communicating the determined control signals to the power inverter such that the permanent magnet motor is operated at the received torque command.

5. The method of claim 1, further comprising:

sensing current that powers the permanent magnet motor;

transforming the sensed current into a sensed direct-axis current and a sensed quadrature-axis current;

estimating torque of the permanent magnet motor based upon at least the sensed direct-axis current and the sensed quadrature-axis current;

comparing the estimated torque with the torque command to determine a torque error signal; and adjusting the torque command based upon the determined torque error signal, the feedforward direct-axis current information, and the feedforward quadrature-axis current information.

6. The method of claim 5, further comprising:

determining the current signal ($i_{dq}*$) based upon at least the adjusted torque command.

7. The method of claim 1, further comprising:

computationally determining the feedforward direct-axis current information and the feedforward quadrature-axis current information based upon at least a direct-axis stator inductance ($L_d$), a quadrature-axis stator inductance ($L_q$), a permanent magnet flux linkage ($\lambda_{PM}$), a voltage ellipse, a maximum torque per voltage (MTPV) curve, and a peak torque per ampere (PTPA) curve.

8. The method of claim 1 wherein computationally determining the feedforward direct-axis current information and the feedforward quadrature-axis current information comprises:

computationally determining the feedforward direct-axis current information and the feedforward quadrature-axis current information based upon at least a theoretical direct-axis stator inductance, a theoretical quadrature-axis stator inductance, and a theoretical permanent magnet flux linkage.

9. The method of claim 1 wherein computationally determining the feedforward direct-axis current information and the feedforward quadrature-axis current information comprises:

computationally determining the direct-axis current feedforward table and the quadrature-axis current feedforward table based upon at least a tested direct-axis stator inductance, a tested quadrature-axis stator inductance, and a tested permanent magnet flux linkage.

10. A system which controls a permanent magnet motor comprising:

feedforward direct-axis current information that is computationally determined from a plurality of parameters associated with the permanent magnet motor;

feedforward quadrature-axis current information that is computationally determined from the plurality of parameters associated with the permanent magnet motor;

a current regulator that receives a current signal ($i_{dq}*$) determined from a received torque command, information corresponding to a direct current (DC) bus voltage, information corresponding to a motor speed, the feedforward direct-axis current information, and the feedforward quadrature-axis current information, and that generates a control signal based upon the received current signal ($i_{dq}*$); and a power inverter controllably coupled to the current regulator that converts received DC power into alternating current (AC) power based upon the control signal generated by the current regulator.

11. The system of claim 10, further comprising:

a processing system operable to computationally determine the direct-axis current feedforward information during operation of the permanent magnet motor, computationally determine the quadrature-axis current feedforward information during operation of the permanent magnet motor, and during operation of the permanent magnet motor, determine the current signal ($i_{dq}^*$) based upon the received torque command, the information corresponding to the direct current (DC) bus voltage and the motor speed, the feedforward direct-axis current information, and the feedforward quadrature-axis current information.

12. The system of claim 10, further comprising:
a memory medium operable to store the direct-axis current feedforward information and the quadrature-axis current feedforward information prior to operation of the permanent magnet motor; and
a processing system, during operation of the permanent magnet motor, operable to determine the current signal ($i_{dq}^*$) based upon the received torque command, the information corresponding to the direct current (DC) bus voltage and the motor speed, the feedforward direct-axis current information, and the feedforward quadrature-axis current information.

13. The system of claim 10 wherein the current regulator that receives the current signal ($i_{dq}^*$) receives a direct-axis current command based upon a received torque command and a received flux command based upon the feedforward direct-axis current information, and receives a quadrature-axis current command based upon the received torque command and the received flux command based upon the feedforward quadrature-axis current information, such that the current regulator generates the control signal based upon the received direct-axis current command and the received quadrature-axis current command.

14. The system of claim 10, further comprising:
a plurality of current transformers electrically coupled to the permanent magnet motor and operable to sense AC current supplied to the permanent magnet motor by the power inverter;
a transformation function device communicatively coupled to the plurality of current transformers, and operable to receive the sensed AC current, and operable to determine a sensed direct-axis current and a sensed quadrature-axis current;
a torque estimator communicatively coupled to the transformation function device, and operable to estimate torque of the permanent magnet motor based upon the sensed direct-axis current and the sensed quadrature-axis current;
a summing junction communicatively coupled to the torque estimator and operable to receive the estimated torque, operable to receive the torque command, and operable to compare the estimated torque with the torque command to determine a torque error signal; and
a torque regulator communicatively coupled to the summing junction and operable to receive the torque error signal such that a current command is determined from the feedforward direct-axis current information and the feedforward quadrature-axis current information is adjusted based upon the determined torque error signal.

15. The system of claim 10, further comprising:
a current regulator responsive to the feedforward direct-axis current information and the feedforward quadrature-axis current information; and
a saturation mode control module electrically coupled to the current regulator and a DC bus that provides the DC power to the power inverter, and operable to prevent saturation of the direct-axis current component or the quadrature-axis current component of the current regulator.

16. A method for controlling a permanent magnet motor, comprising:
computationally determining a direct-axis current feedforward table from a plurality of parameters associated with the permanent magnet motor;
computationally determining a quadrature-axis current feedforward table from the plurality of parameters associated with the permanent magnet motor;
determining a current command comprising a direct-axis current determined from the direct-axis current feedforward table and a quadrature-axis current determined from the quadrature-axis current feedforward table; and
controlling a power inverter that converts direct current (DC) power into alternating current (AC) power that is supplied to the permanent magnet motor, such that the permanent magnet motor is operated in accordance with the determined direct-axis current and the determined quadrature-axis current.

17. The method of claim 16, further comprising:
computationally determining the direct-axis current feedforward table and the quadrature-axis current feedforward table based upon at least a direct-axis stator inductance ($L_d$), a quadrature-axis stator inductance ($L_q$), a permanent magnet flux linkage ($\lambda_{PM}$), a voltage ellipse, a maximum torque per voltage (MTPV) curve, a peak torque per ampere (PTPA) curve, and a current limit circle.

18. The method of claim 17, further comprising:
recursively calculating the voltage ellipse using a tested direct-axis stator inductance ($L_d$) parameter, a tested quadrature-axis stator inductance ($L_q$) parameter, and a tested permanent magnet flux linkage ($\lambda_{PM}$) parameter.

19. The method of claim 16, further comprising:
receiving a torque command and information corresponding to a direct current (DC) bus voltage and a motor speed; and
determining the current command based upon the received torque command, the direct current (DC) bus voltage, and the motor speed.

20. The method of claim 19, further comprising:
measuring input AC current to the permanent magnet motor;
determining transforming the measured input AC current into a sensed direct-axis current and a sensed quadrature-axis current;
estimating torque of the permanent magnet motor based upon the sensed direct-axis current and the sensed quadrature-axis current;
comparing the estimated torque with the torque command to determine a torque error signal; and
adjusting the current command based upon the determined torque error signal.

21. The method of claim 16, further comprising:
adjusting a flux input into the direct-axis current feedforward table and the quadrature-axis current feedforward table to prevent saturation.

* * * * *